United States Patent
Nukui

(10) Patent No.: US 11,827,770 B2
(45) Date of Patent: Nov. 28, 2023

(54) GLASS FIBER-REINFORCED RESIN MOLDED PRODUCT

(71) Applicant: NITTO BOSEKI CO., LTD., Fukushima (JP)

(72) Inventor: Yosuke Nukui, Fukushima (JP)

(73) Assignee: Nitto Bosekl Co., Ltd., Fukushima (JP)

( * ) Notice: Subject to any disclaimer, the term of this patent is extended or adjusted under 35 U.S.C. 154(b) by 0 days.

(21) Appl. No.: 18/016,710

(22) PCT Filed: Oct. 4, 2021

(86) PCT No.: PCT/JP2021/036664
§ 371 (c)(1),
(2) Date: Jan. 18, 2023

(87) PCT Pub. No.: WO2022/075273
PCT Pub. Date: Apr. 14, 2022

(65) Prior Publication Data
US 2023/0212373 A1    Jul. 6, 2023

(30) Foreign Application Priority Data
Oct. 8, 2020    (JP) ................. 2020-170774

(51) Int. Cl.
C08K 7/14    (2006.01)
C08L 67/02    (2006.01)

(52) U.S. Cl.
CPC ............. C08K 7/14 (2013.01); C08L 67/02 (2013.01)

(58) Field of Classification Search
None
See application file for complete search history.

(56) References Cited

U.S. PATENT DOCUMENTS

| | | | |
|---|---|---|---|
| 11,059,946 B2 | 7/2021 | Tsuchigane et al. | |
| 11,091,596 B2 | 8/2021 | Nukui et al. | |
| 2012/0178610 A1* | 7/2012 | Hublikar | C03C 13/00 174/258 |
| 2020/0102431 A1* | 4/2020 | Nukui | C08L 27/06 |

FOREIGN PATENT DOCUMENTS

| | | |
|---|---|---|
| CN | 101549958 A | 10/2009 |
| CN | 101696089 A | 4/2010 |
| JP | 2010-260781 A | 11/2010 |
| JP | 2011-105555 A | 6/2011 |
| JP | 2017-031414 A | 2/2017 |
| JP | 2017-052974 A | 3/2017 |
| WO | 2010/109721 A1 | 9/2010 |
| WO | WO 2016/183133 * | 11/2016 |
| WO | 2020/137004 A1 | 7/2020 |
| WO | 2020/166518 A1 | 8/2020 |

OTHER PUBLICATIONS

Office Action dated Jun. 28, 2023 issued in the corresponding Chinese Patent Application No. 202180049421.1 with the English machine translation thereof.

* cited by examiner

Primary Examiner — Robert T Butcher
(74) Attorney, Agent, or Firm — Carrier, Shende & Associates P.C.; Joseph P. Carrier; Jeffrey T. Gedeon

(57) ABSTRACT

Provided is a glass fiber-reinforced resin molded article having high dimension stability and low dielectric characteristics. In the glass fiber-reinforced resin molded article, the fiber diameter D of glass fiber included in the glass fiber-reinforced resin molded article is in the range of 5.0 to 15.0 μm, the dielectric constant Dk at a measurement frequency of 1 GHz of the glass fiber is in the range of 4.0 to 7.0, the linear expansion coefficient C of the glass fiber is in the range of 2.0 to 6.0 ppm/K, the number average fiber length L of the glass fiber is in the range of 150 to 400 μm, and the D, Dk, C, and L satisfy the following formula (1):

$$57.9 \leq Dk \times C^{1/4} \times L^{1/2}/D^{1/4} \leq 70.6 \qquad (1)$$

4 Claims, No Drawings

GLASS FIBER-REINFORCED RESIN MOLDED PRODUCT

TECHNICAL FIELD

The present invention relates to a glass fiber-reinforced resin molded article.

BACKGROUND ART

Conventionally, glass fiber has been widely used in various applications to improve the strength of resin molded articles. In glass fiber-reinforced resin molded articles, glass fiber comprising an E glass composition (E glass fiber) is most commonly used. The E glass composition herein is a composition including $SiO_2$ in the range of 52.0 to 56.0% by mass, $Al_2O_3$ in the range of 12.0 to 16.0% by mass, MgO and CaO in the range of 20.0 to 25.0% by mass in total, and $B_2O_3$ in the range of 5.0 to 10.0% by mass, with respect to the total amount of the glass fiber.

As applications of glass fiber-reinforced resin molded articles have recently expanded to portable electronic device parts, metal substitute materials for automobiles, and the like, the performance required for glass fiber-reinforced resin molded articles has become more sophisticated.

In accordance with sophistication of the performance required for glass fiber-reinforced resin molded articles, the present applicant has proposed a glass fiber-reinforced resin molded article in which glass fiber comprising a glass composition other than the E glass composition is used (see Patent Literature 1 and Patent Literature 2).

Patent Literature 1 mentions that a glass fiber-reinforced resin molded article combines high tensile strength, high bending strength, high flexural modulus, and high impact strength, the glass fiber-reinforced resin molded article including glass fiber comprising a glass composition including $SiO_2$ in the range of 57.0 to 60.0% by mass, $Al_2O_3$ in the range of 17.5 to 20.0% by mass, MgO in the range of 8.5 to 12.0% by mass, CaO in the range of 10.0 to 13.0% by mass, $B_2O_3$ in the range of 0.5 to 1.5% by mass, and $SiO_2$, $Al_2O_3$, MgO, and CaO in the range of 98.0% by mass or more in total, with respect to the total amount of the glass fiber.

Patent Literature 2 mentions that a glass fiber-reinforced resin molded article combines high tensile strength, high impact strength, a low dielectric constant, and a low dielectric tangent, the glass fiber-reinforced resin molded article including glass fiber comprising a glass composition including $SiO_2$ in the range of 52.0 to 57.0% by mass, $Al_2O_3$ in the range of 13.0 to 17.0% by mass, $B_2O_3$ in the range of 15.0 to 21.5% by mass, MgO in the range of 2.0 to 6.0% by mass, CaO in the range of 2.0 to 6.0% by mass, $TiO_2$ in the range of 1.0 to 4.0% by mass, $F_2$ of less than 1.5% by mass, and $Li_2O$, $Na_2O$, and $K_2O$ of less than 0.6% by mass in total, with respect to the total amount of the glass fiber.

Patent Literature 2 also mentions that the dielectric loss energy in a glass fiber-reinforced resin molded article is proportional to the dielectric constant and dielectric tangent of the glass fiber-reinforced resin molded article and is represented by the following formula ($\alpha$). It is generally known that glass absorbs energy from an alternating current as heat, and the energy absorbed by glass is dielectric loss energy.

$$W = kfv^2 \times \varepsilon \tan \delta \qquad (\alpha)$$

In the formula ($\alpha$), W represents dielectric loss energy, k represents a constant, f represents a frequency, $v^2$ represents a potential gradient, $\varepsilon$ represents a dielectric constant, and $\tan \delta$ represents a dielectric tangent. From the above formula ($\alpha$), it can be seen that as the dielectric constant and the dielectric tangent are larger, the dielectric loss becomes larger and heat generation of the glass becomes larger.

Accordingly, lowering the dielectric constant and dielectric tangent of a glass fiber-reinforced resin molded article enables heat generation of the glass fiber-reinforced resin molded article to be suppressed under an environment in which an alternating current flows.

In addition, glass absorbs energy from an alternating current as heat. Thus, when the resin molded article is used for the housing or parts of the electronic device, there is a problem in that the resin molded article generates heat.

CITATION LIST

Patent Literature

Patent Literature 1: Japanese Patent Laid-Open No. 2017-31414
Patent Literature 2: Japanese Patent Laid-Open No. 2017-52974

SUMMARY OF INVENTION

Technical Problem

Reduction in the weight, thickness, length, and size of parts and increase in the integration density of parts have been under progress in recent years, mainly in portable electronic devices. In order to reduce costs by reducing the number of parts, appropriate use of different materials such as iron, metal, resins, and fiber-reinforced resins in appropriate places has been actively contemplated. Particularly, there have been increasing examples employing a glass fiber-reinforced resin molded article for integral molding with a metal (specifically, aluminum, stainless, or the like). For this reason, glass fiber-reinforced resin molded articles for use particularly in portable electronic device parts have been required to have a more robust bonding portion with metal. Glass fiber-reinforced resin molded articles generally have a larger degree of deformation (contraction, expansion) than that of metal. This difference in the amount of deformation is assumed to be one factor to weaken the bonding with metal to thereby result in insufficient adhesion or failures of devices. Thus, glass fiber-reinforced resin molded articles are required to comprise higher dimension stability, particularly a lower linear expansion coefficient than that of conventional ones. In accordance with handling of higher frequencies by portable electronic devices, suppression of heat generation in glass fiber-reinforced resin molded articles has become more important, and lowering the dielectric characteristics of glass fiber-reinforced resin molded article is also necessary.

The glass fiber-reinforced resin molded article including glass fiber comprising the glass composition described in Patent Literature 1 or Patent Literature 2, however, has a disadvantage of inability to combine high dimension stability and low dielectric characteristics.

An object of the present invention is to eliminate such a disadvantage to provide a glass fiber-reinforced resin molded article combining high dimension stability and low dielectric characteristics.

Solution to Problem

In order to achieve the object, in the glass fiber-reinforced resin molded article of the present invention, the fiber diameter D of glass fiber included in the glass fiber-reinforced resin molded article is a length in the range of 5.0 to 15.0 μm, the dielectric constant at a measurement frequency of 1 GHz Dk of the glass fiber included in the glass fiber-reinforced resin molded article is in the range of 4.0 to 7.0, the linear expansion coefficient C of the glass fiber included in the glass fiber-reinforced resin molded article is in the range of 2.0 to 6.0 ppm/K, the number average fiber length L of the glass fiber included in the glass fiber-reinforced resin molded article is a length in the range of 150 to 400 μm, and the D, Dk, C, and L satisfy the following formula (1).

$$57.9 \leq Dk \times C^{1/4} \times L^{1/2}/D^{1/4} \leq 70.6 \quad (1)$$

According to the glass fiber-reinforced resin molded article of the present invention, the D, Dk, C, and L being in the above range and satisfying the conditions of the above formula (1) allow the resin molded article to combine high dimension stability and low dielectric characteristics. The glass fiber-reinforced resin molded article combining high dimension stability and low dielectric characteristics here means that a dimension stability dielectric characteristic index shown below is 0.85 or less. The dimension stability—dielectric characteristic index is a ratio ((MDk×MC)/(EDk×EC)) of the value (MDk×MC) obtained by multiplying the dielectric constant at a measurement frequency of 1 GHz MDk of the glass fiber-reinforced resin molded article of the present invention by the linear expansion coefficient MC of the glass fiber-reinforced resin molded article of the present invention to the value obtained by multiplying the dielectric constant at a measurement frequency of 1 GHz EDk of a reference glass fiber-reinforced resin molded article by the linear expansion coefficient EC of the reference glass fiber-reinforced resin molded article. The reference glass fiber-reinforced resin molded article is a glass fiber-reinforced resin molded article that includes glass fiber comprising an E glass composition and having a fiber diameter of 11.0 m at the same content as that of the glass fiber-reinforced resin molded article of the present invention, having been produced by the same molding conditions as those of the glass fiber-reinforced resin molded article of the present invention.

The dielectric constant at a measurement frequency of 1 GHz Dk of the glass fiber can be measured by the following method. First, the glass fiber-reinforced resin molded article heated, for example, in a muffle furnace at a temperature in the range of 300 to 650° C. for about 0.5 to 24 hours to decompose organic matter. Next, the remaining glass fiber is placed in a platinum crucible and melted with stirring while being held at a temperature of 1600° C. for 6 hours in an electric furnace to obtain a homogeneous molten glass. Next, the platinum crucible including the molten glass is taken out of the electric furnace to cool the molten glass. Next, the molten glass is tapped out of the platinum crucible, then heated at a strain removal temperature (660 to 750° C.) for 2 hours in order to remove the strain of the glass, and cooled to room temperature (20 to 25° C.) over 8 hours to thereby obtain a glass mass. Next, the obtained glass mass is processed into a test piece of 3 mm in width, 80 mm in length, and 1 mm in thickness using a cutting machine, for example, a diamond cutter and a grinder. Next, the obtained test piece is measured for its dielectric constant at a measurement frequency of 1 GHz in accordance with JIS C 2565:1992 to thereby enable the dielectric constant at a measurement frequency of 1 GHz Dk of the glass fiber to be measured.

The linear expansion coefficient C of the glass fiber can be calculated by the following method. First, a glass mass is obtained in the entirely same manner as in the method for measuring the dielectric constant of the glass fiber described above. Next, the obtained glass mass is processed into a test piece of 4 mm×4 mm×20 mm using a cutting machine, for example, a diamond cutter and a grinder. Next, the obtained test piece is heated at a temperature increase rate of 10° C./min, and its amount of elongation is measured at a temperature in the range of 50 to 200° C. using a thermomechanical analyzer (manufactured by Hitachi High-Tech Science Corporation). The linear expansion coefficient is calculated from the amount of elongation to thereby enable the linear expansion coefficient C of the glass fiber to be calculated.

The dielectric constant at a measurement frequency of 1 GHz of the glass fiber-reinforced resin molded article can be measured in accordance with JIS C 2565:1992.

The linear expansion coefficient of the glass fiber-reinforced resin molded article can be calculated in accordance with JIS K 7197:2012 (measurement temperature range: 50 to 200° C., temperature increase rate: 10° C./min).

In the glass fiber-reinforced resin molded article of the present invention, the D, Dk, C, and L preferably satisfy the following formula (2).

$$58.2 \leq Dk \times C^{1/4} \times L^{1/2}/D^{1/4} \leq 61.7 \quad (2)$$

According to the glass fiber-reinforced resin molded article of the present invention, the D, Dk, C, and L being in the above range and satisfying the conditions of the above formula (2) allow the glass fiber-reinforced resin molded article to combine high dimension stability and low dielectric characteristics at a higher level. The glass fiber-reinforced resin molded article combining high dimension stability and low dielectric characteristics at a higher level here means that a dimension stability—dielectric characteristic index shown below is 0.80 or less. The dimension stability—dielectric characteristic index is a ratio ((MDk×MC)/(EDk×EC)) of the value (MDk×MC) obtained by multiplying the dielectric constant at a measurement frequency of 1 GHz MDk of the glass fiber-reinforced resin molded article of the present invention by the linear expansion coefficient MC of the glass fiber-reinforced resin molded article of the present invention to the value obtained by multiplying the dielectric constant at a measurement frequency of 1 GHz EDk of a reference glass fiber-reinforced resin molded article by the linear expansion coefficient EC of the reference glass fiber-reinforced resin molded article. The reference glass fiber-reinforced resin molded article is a glass fiber-reinforced resin molded article that includes glass fiber comprising an E glass composition and having a fiber diameter of 11.0 m at the same content as that of the glass fiber-reinforced resin molded article of the present invention, having been produced by the same molding conditions as those of the glass fiber-reinforced resin molded article of the present invention.

In the glass fiber-reinforced resin molded article of the present invention, the glass fiber included in the glass fiber-reinforced resin molded article preferably comprises a composition including $SiO_2$ in the range of 60.00 to 70.00% by mass, $Al_2O_3$ in the range of 20.00 to 30.00% by mass, MgO in the range of 5.00 to 15.0% by mass, $Fe_2O_3$ in the range of 0.15 to 1.50% by mass, and $Li_2O$, $Na_2O$, and $K_2O$ in the range of 0.02 to 0.20% by mass in total, with respect to the total amount of the glass fiber.

In the glass fiber-reinforced resin molded article of the present invention, the resin included in the glass fiber-reinforced resin molded article is preferably polybutylene terephthalate.

DESCRIPTION OF EMBODIMENTS

Hereinafter, embodiments of the present invention will be described in detail.

In a glass fiber-reinforced resin molded article of the present embodiment, glass fiber included in the glass fiber-reinforced resin molded article has a fiber diameter D in the range of 5.0 to 15.0 μm, the dielectric constant at a measurement frequency of 1 GHz Dk of the glass fiber included in the glass fiber-reinforced resin molded article is in the range of 4.0 to 7.0, the linear expansion coefficient C of the glass fiber included in the glass fiber-reinforced resin molded article is in the range of 2.0 to 6.0 ppm/K, the number average fiber length L of the glass fiber included in the glass fiber-reinforced resin molded article is in the range of 150 to 400 μm, and the D, Dk, C, and L satisfy the following formula (1).

$$57.9 \leq Dk \times C^{1/4} \times L^{1/2}/D^{1/4} \leq 70.6 \quad (1)$$

According to the glass fiber-reinforced resin molded article of the present embodiment, the D, Dk, C, and L being in the above range and satisfying the conditions of the above formula (1) allow the glass fiber-reinforced resin molded article to combine high dimension stability and low dielectric characteristics.

In the glass fiber-reinforced resin molded article of the present embodiment, the fiber diameter D of the glass fiber is less than 5.0 μm, the number of glass fibers becomes significantly large on kneading the resin and glass fiber to thereby lower the productivity, and the fiber length becomes significantly short to thereby fail to obtain a sufficient reinforcing effect. In contrast, in the glass fiber-reinforced resin molded article of the present embodiment, when the fiber diameter D of the glass fiber exceeds 15.0 μm, the contact surface area between the resin and the glass fiber decreases to thereby fail to obtain a sufficient reinforcing effect.

In the glass fiber-reinforced resin molded article of the present embodiment, the fiber diameter D of the glass fiber is preferably in the range of 6.0 to 14.0 μm, more preferably in the range of 7.0 to 13.0 μm, further preferably in the range of 8.0 to 12.0 μm, and particularly preferably in the range of 8.5 to 11.5 μm.

The fiber diameter D of the glass fiber in the glass fiber-reinforced molded article of the present embodiment can be calculated by, for example, first, polishing a cross section of the glass fiber-reinforced resin molded article, then, measuring the length of the diameter of glass filaments and determining the average values thereof for 100 or more glass filaments using an electron microscope. Glass filaments usually have a round cross-sectional shape.

The glass fiber is usually formed by a plurality of glass filaments bundled, but in the glass fiber-reinforced resin molded article, which is subjected to molding processing, the glass filaments are debundled and present dispersed in a glass filament state in the glass fiber-reinforced resin molded article.

In glass fiber-reinforced resin molded article of the present embodiment, glass fiber having a dielectric constant at a measurement frequency of 1 GHz Dk of less than 4.0 is difficult to use from the viewpoint of economic efficiency because of its low manufacturability. In contrast, when the dielectric constant at a measurement frequency of 1 GHz Dk of the glass fiber exceeds 7.0, the glass fiber-reinforced resin molded article cannot comprise sufficient dielectric characteristics.

In the glass fiber-reinforced resin molded article of the present embodiment, the dielectric constant at a measurement frequency of 1 GHz Dk of the glass fiber is preferably in the range of 5.1 to 5.9, more preferably in the range of 5.2 to 5.6, and further preferably in the range of 5.3 to 5.5.

In glass fiber-reinforced resin molded article of the present embodiment, glass fiber having a linear expansion coefficient C of the glass fiber of less than 2.0 ppm/K is difficult to use from the viewpoint of economic efficiency because of its low manufacturability. In contrast, when the linear expansion coefficient C of the glass fiber exceeds 6.0 ppm/K, the glass fiber-reinforced resin molded article cannot comprise sufficient dimension stability.

In the glass fiber-reinforced resin molded article of the present embodiment, the linear expansion coefficient C of the glass fiber is preferably in the range of 2.2 to 3.4 ppm/K, more preferably in the range of 2.5 to 3.1 ppm/K, and further preferably in the range of 2.6 to 3.0 ppm/K.

In the glass fiber-reinforced resin molded article of the present embodiment, when the number average fiber length L of the glass fiber is less than 150 μm, the effect of the glass fiber for reinforcing the glass fiber-reinforced resin molded article becomes insufficient. In contrast, when the number average fiber length L of the glass fiber exceeds 400 μm, the appearance of the glass fiber-reinforced resin molded article is compromised.

In the glass fiber-reinforced resin molded article of the present embodiment, the number average fiber length L of the glass fiber is preferably in the range of 170 to 340 μm, more preferably in the range of 200 to 320 μm, further preferably in the range of 210 to 300 μm, particularly preferably in the range of 220 to 290 μm, and most preferably in the range of 225 to 285 μm.

In the glass fiber-reinforced resin molded article of the present embodiment, the number average fiber length L of the glass fiber can be calculated by the following method, for example. First, the glass fiber-reinforced resin molded article is heated in a muffle furnace at 650° C. for 0.5 to 24 hours to decompose organic matter. Then, the remaining glass fiber is transferred to a glass petri dish, and the glass fiber is dispersed using acetone on the surface of the petri dish. Subsequently, the fiber length of 1000 or more glass fiber dispersed on the petri dish surface is measured using a stereoscopic microscope. Then, the average values thereof is determined, thereby enabling the number average fiber length L of the glass fiber to be calculated.

Here, when the glass fiber-reinforced resin molded article of the present embodiment is obtained by injection molding, the number average fiber length L of the glass fiber included in the glass fiber-reinforced resin molded article of the present embodiment can be controlled by adjusting, for example, the length of the chopped strands to be charged into a twin-screw kneader or the screw rotation speed of the twin-screw kneader. The length of the chopped strands to be charged into a twin-screw kneader is adjusted within the range of 1.0 to 100.0 mm, for example. The L can be made longer by making the length of the chopped strands to be charged into a twin-screw kneader longer, and the L can be made shorter by making the length of the chopped strands shorter. The screw rotation speed of the twin-screw kneader is adjusted within the range of 10 to 1000 rpm. The L can be made longer by lowering the screw rotation speed during twin-screw kneading, and can be made shorter by elevating the screw rotation speed.

The glass fiber-reinforced resin molded article of the present embodiment combines high dimension stability and low dielectric characteristics when the D, Dk, C, and L satisfy the following formula (1).

$$57.9 \leq Dk \times C^{1/4} \times L^{1/2}/D^{1/4} \leq 70.6 \quad (1)$$

In the glass fiber-reinforced resin molded article of the present embodiment, as the glass fiber-reinforced resin molded article will combine high dimension stability and low dielectric characteristics at a higher level, the D, Dk, C, and L preferably satisfy the following formula (2), more preferably satisfy the following formula (3), and further preferably satisfy the following formula (4).

$$58.2 \leq Dk \times C^{1/4} \times L^{1/2}/D^{1/4} \leq 61.7 \quad (2)$$

$$59.0 \leq Dk \times C^{1/4} \times L^{1/2}/D^{1/4} \leq 61.0 \quad (3)$$

$$59.5 \leq Dk \times C^{1/4} \times L^{1/2}/D^{1/4} \leq 60.5 \quad (4)$$

In the glass fiber-reinforced resin molded article of the present embodiment, the glass fiber included in the glass fiber-reinforced resin molded article preferably comprises a composition including $SiO_2$ in the range of 60.00 to 70.00% by mass, $Al_2O_3$ in the range of 20.00 to 30.00% by mass, MgO in the range of 5.00 to 15.0% by mass, $Fe_2O_3$ in the range of 0.15 to 1.50% by mass, and $Li_2O$, $Na_2O$, and $K_2O$ in the range of 0.02 to 0.20% by mass in total, with respect to the total amount of the glass fiber.

In the glass fiber included in the glass fiber-reinforced resin molded article of the present embodiment, the content of $SiO_2$ with respect to the total amount of the glass fiber is preferably in the range of 60.50 to 67.50% by mass, more preferably in the range of 61.00 to 67.00% by mass, further preferably in the range of 63.00 to 66.50% by mass, and particularly preferably in the range of 64.00 to 66.00% by mass.

In the glass fiber included in the glass fiber-reinforced resin molded article of the present embodiment, the content of $Al_2O_3$ with respect to the total amount of the glass fiber is preferably in the range of 20.50 to 27.50% by mass, more preferably in the range of 21.00 to 27.00% by mass, further preferably in the range of 23.00 to 26.50% by mass, and particularly preferably in the range of 24.00 to 26.00% by mass.

In the glass fiber included in the glass fiber-reinforced resin molded article of the present embodiment, the content of MgO with respect to the total amount of the glass fiber is preferably in the range of 6.00 to 14.00% by mass, more preferably in the range of 7.00 to 13.00% by mass, further preferably in the range of 8.00 to 12.50% by mass, and particularly preferably in the range of 9.00 to 11.00% by mass.

In the glass fiber included in the glass fiber-reinforced resin molded article of the present embodiment, the content of $Fe_2O_3$ with respect to the total amount of the glass fiber is preferably in the range of 0.15 to 0.50% by mass, more preferably in the range of 0.20 to 0.45% by mass, further preferably in the range of 0.25 to 0.45% by mass, and particularly preferably in the range of 0.30 to 0.40% by mass. The glass fiber included in the glass fiber-reinforced resin molded article of the present embodiment, by including $Fe_2O_3$ in this range, enables deaeration ability of molten glass to be improved to thereby improve the manufacturability of the glass fiber while suppressing coloration of the glass fiber.

In the glass fiber included in the glass fiber-reinforced resin molded article of the present embodiment, the total content of $Li_2O$, $Na_2O$, and $K_2O$ with respect to the total amount of the glass fiber is preferably in the range of 0.03 to 0.15% by mass and more preferably in the range of 0.04 to 0.10% by mass. The glass fiber included in the glass fiber-reinforced resin molded article of the present embodiment, by including $Li_2O$, $Na_2O$, and $K_2O$ in this range, enables the melt viscosity of the molten glass to be lowered to thereby improve the manufacturability of the glass fiber while maintaining the dielectric constant of the glass fiber low.

The glass fiber included in the glass fiber-reinforced resin molded article of the present embodiment may include CaO in the range of 0.01 to 0.10% by mass. The glass fiber included in the glass fiber-reinforced resin molded article of the present embodiment, by including CaO in this range, enables the melt viscosity of the molten glass to be lowered to thereby improve the manufacturability of the glass fiber while maintaining the strength and elastic modulus of the glass fiber high.

The glass fiber included in the glass fiber-reinforced resin molded article of the present embodiment may include $ZrO_2$ in the range of 0.01 to 0.10% by mass. The glass fiber included in the glass fiber-reinforced resin molded article of the present embodiment, by including $ZrO_2$ in this range, enables the melt viscosity of the molten glass to be lowered to thereby improve the manufacturability of the glass fiber while the maintaining the linear expansion coefficient of the glass fiber low.

The glass fiber included in the glass fiber-reinforced resin molded article of the present embodiment preferably includes substantially none of $B_2O_3$, $F_2$, and $TiO_2$ (i.e., the content thereof is less than 0.01% by mass) and more preferably includes none thereof (i.e., the content is 0% by mass). The glass fiber included in the glass fiber-reinforced resin molded article of the present embodiment, by including substantially none of $B_2O_3$, $F_2$, and $TiO_2$, enables the acid resistance of the glass fiber to be improved while maintaining the elastic modulus of the glass fiber high.

In the glass fiber included in the glass fiber-reinforced resin molded article of the present embodiment, the ratio of the content of MgO with respect to the total content of $Fe_2O_3$ and CaO ($MgO/(Fe_2O_3+CaO)$) is preferably in the range of 17.0 to 37.0, more preferably in the range of 20.0 to 34.0, further preferably in the range of 21.0 to 33.0, particularly preferably in the range of 22.0 to 32.0, and most preferably in the range of 23.0 to 31.0. The glass fiber included in the glass fiber-reinforced resin molded article of the present embodiment, by including MgO, $Fe_2O_3$, and CaO at a ratio in this range, enables the elastic modulus of the glass fiber and the manufacturability of the glass fiber to be simultaneously achieved at a high level.

Regarding measurement of the content of each component described above in the glass fiber included in the glass fiber-reinforced resin molded article of the present embodiment, the content of Li as the light element can be measured with an ICP emission spectroscopic analyzer, and the contents of the other elements can be measured with a wavelength dispersive X-ray fluorescence analyzer. In the measurement method, first, molten glass is obtained in the entirely same manner as in the method for measuring the dielectric constant of the glass fiber described above. Next, the obtained molten glass is poured from the platinum crucible onto a carbon plate to produce a glass cullet, and then pulverized and powdered to give glass powder. Regarding Li as a light element, the glass powder is thermally decomposed with an acid and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above content (% by mass) of each component can be determined from these numerical values.

The glass fiber comprising the above glass composition is produced as follows. First, a glass raw material (glass batch) prepared to have the above composition is supplied to a melting furnace and melted at a temperature in the range of 1450 to 1550° C., for example. Then, the melted glass batch (melted glass) is drawn from nozzle tips, of which the number is in the range of 1 to 30000, of a bushing controlled at a predetermined temperature and rapidly cooled to form glass filaments. Subsequently, the glass filaments formed are applied with a sizing agent or binder using an applicator as an application apparatus. While the glass filaments in the range of 1 to 30000 are bundled using a bundling shoe, the glass filaments are wound on a tube at a high speed using a winding apparatus to obtain glass fiber.

Here, examples of the preferred form taken by the glass fiber included in the glass fiber-reinforced resin molded article of the present embodiment before molding processing include chopped strands, in which the number of glass filaments constituting the glass fiber (number bundled) is preferably in the range of 1 to 20000, more preferably 50 to 10000, and further preferably 1000 to 8000 and the glass fiber (also referred to as a glass fiber bundle or glass strand) is preferably cut into a length in the range of 1.0 to 100.0 mm, more preferably 1.2 to 51.0 mm, further preferably, 1.5 to 30.0 mm, particularly preferably 2.0 to 15.0 mm, and most preferably 2.3 to 7.8 mm. Other examples of the form that may be taken by the glass fiber included in the glass fiber-reinforced resin molded article of the present embodiment before molding processing can include rovings and cut fiber, in addition to chopped strands.

The roving is a form in which the number of glass filaments constituting the glass fiber is 10 to 30000 and which is obtained without cutting. The cut fiber is a form in which the number of glass filaments constituting the glass fiber is 1 to 20000 and which is obtained by pulverization so as to have a length in the range of 0.001 to 0.900 mm by a known method such as a ball mill or Henschel mixer.

The glass fiber included in the glass fiber-reinforced resin molded article of the present embodiment may be coated with an organic matter on the surface thereof for the purposes such as improvement of adhesiveness between glass fiber and a resin, and improvement of uniform dispersibility of glass fiber in a mixture of glass fiber and a resin or inorganic material. Examples of such organic matter include resins such as urethane resins, epoxy resins, vinyl acetate resins, acrylic resins, modified polypropylene (particularly carboxylic acid-modified polypropylene), and a copolymer of (poly)carboxylic acid (particularly maleic acid) and an unsaturated monomer, or a silane coupling agent.

The glass fiber included in the glass fiber-reinforced resin molded article of the present embodiment may be coated with a composition including a lubricant, a surfactant, and the like, in addition to these resins or a silane coupling agent. Such a composition covers the glass fiber at a rate of 0.1 to 2.0% by mass based on the mass of the glass fiber in a state where it is not coated with the composition.

The glass fiber can be coated with an organic matter by applying a sizing agent or binder to the glass fiber using a known method such as a roller applicator, for example, in the manufacturing process of the glass fiber. The sizing agent or binder include a solution of the resin, the silane coupling agent, or the composition. Coating of the glass fiber can be then performed by drying the glass fiber to which the solution of the resin, the silane coupling agent, or the composition is applied.

Here, examples of the silane coupling agent include aminosilanes, chlorosilanes, epoxysilanes, mercaptosilanes, vinylsilanes, acrylsilanes, and cationic silanes. As the silane coupling agent, these compounds can be used singly or in combination of two or more.

Examples of the aminosilane include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

Examples of the chlorosilane include γ-chloropropyltrimethoxysilane.

Examples of the epoxy silane include γ-glycidoxypropyltrimethoxysilane and 3-(3,4-epoxy cyclohexyl)ethyltrimethoxysilane.

Examples of the mercaptosilane include γ-mercaptotrimethoxysilane.

Examples of the vinyl silane include vinyl trimethoxysilane and N-β-(N-vinylbenzylaminoethyl)-γ-aminopropyltrimethoxysilane.

Examples of the acrylsilane include γ-methacryloxypropyltrimethoxysilane.

Examples of the cationic silane include N-(vinylbenzyl)-2-aminoethyl-3-aminopropyltrimethoxysilane hydrochloride and N-phenyl-3-aminopropyltrimethoxysilane hydrochloride.

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyethyleneimine, polyalkylpolyamine alkylamide derivatives, fatty acid amides, and quaternary ammonium salts. As the lubricant, these can be used singly or in combinations of two or more.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of polyethylenepolyamines such as diethylenetriamine, triethylenetetramine, and tetraethylenepentamine and fatty acids such as lauric acid, myristic acid, palmitic acid, and stearic acid, for example.

Examples of the quaternary ammonium salt include alkyltrimethylammonium salts such as lauryltrimethylammonium chloride.

Examples of the surfactant include nonionic surfactants, cationic surfactants, anionic surfactants, and amphoteric surfactants. As the surfactant, these compounds can be used singly or in combination of two or more.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine salts (such as acetate and hydrochloride), adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant can include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant can include amino acid amphoteric surfactants such as alkali metal salts of alkylaminopropionic acid, betaine amphoteric surfactants such as alkyldimethylbetaine, and imidazoline amphoteric surfactants.

The glass fiber included in the glass fiber-reinforced resin molded article of the present embodiment, without limited to a reinforcing material in glass fiber-reinforced resin molded articles, also can be suitably used as a reinforcing material in inorganic materials such as gypsum and cement. For example, when used as a reinforcing material for gypsum (especially, a gypsum board of 4 to 60 mm in thickness), the glass fiber comprising the range can be included in the range of 0.1 to 4.0% by mass with respect to the total mass of gypsum and can contribute to improvement in the mechanical strength, fireproof performance, dimension stability, and the like of the gypsum. Glass fiber can be present in the gypsum with a number average fiber length of 30 to 25000 μm.

As the resin included in the glass fiber-reinforced resin molded article of the present embodiment, a thermoplastic resin or thermosetting resin can be used. As there are many applications in which high dimension stability and low dielectric characteristics are required, a thermoplastic resin is preferably used.

Examples of the above thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl ether ketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Specific examples of the polyethylene can include high density polyethylene (HDPE), medium density polyethylene (MDPE), low density polyethylene (LDPE), linear low density polyethylene (LLDPE), and ultra-high molecular weight polyethylene.

Examples of the polypropylene can include isotactic polypropylene, atactic polypropylene, syndiotactic polypropylene, and mixtures thereof.

Examples of the polystyrene can include general-purpose polystyrene (GPPS), which is an atactic polystyrene having an atactic structure, high impact polystyrene (HIPS) with a rubber component added to GPPS, and syndiotactic polystyrene having a syndiotactic structure.

Examples of the methacrylic resin can include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride can include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (polyamide 6), polyhexamethylene adipamide (polyamide 66), polytetramethylene adipamide (polyamide 46), polytetramethylene sebacamide (polyamide 410), polypentamethylene adipamide (polyamide 56), polypentamethylene sebacamide (polyamide 510), polyhexamethylene sebacamide (polyamide 610), polyhexamethylene dodecamide (polyamide 612), polydecamethylene adipamide (polyamide 106), polydecamethylene sebacamide (polyamide 1010), polydecamethylene dodecamide (polyamide 1012), polyundecanamide (polyamide 11), polyundecamethylene adipamide (polyamide 116), polydodecanamide (polyamide 12), polyxylene adipamide (polyamide XD6), polyxylene sebacamide (polyamide XD10), polymetaxylylene adipamide (polyamide MXD6), polyparaxylylene adipamide (polyamide PXD6), polytetramethylene terephthalamide (polyamide 4T), polypentamethylene terephthalamide (polyamide 5T), polyhexamethylene terephthalamide (polyamide 6T), polyhexamethylene isophthalamide (polyamide 6I), polynonamethylene terephthalamide (polyamide 9T), polydecamethylene terephthalamide (polyamide 10T), polyundecamethylene terephthalamide (polyamide 1IT), polydodecamethylene terephthalamide (polyamide 12T), polytetramethylene isophthalamide (polyamide 4I), polybis(3-methyl-4-aminohexyl) methane terephthalamide (polyamide PACMT), polybis(3-methyl-4-aminohexyl) methane isophthalamide (polyamide PACMI), polybis(3-methyl-4-aminohexyl) methane dodecamide (polyamide PACM12), and polybis(3-methyl-4-aminohexyl) methane tetradecamide (polyamide PACM14), or copolymers obtained by combining two or more of the components, and mixtures thereof.

Examples of the polyacetal can include a homopolymer with oxymethylene units as the main repeating unit, and a copolymer mainly composed of oxymethylene units and containing oxyalkylene units having 2 to 8 adjacent carbon atoms in the main chain.

Examples of the polyethylene terephthalate can include polymers obtained by polycondensation of terephthalic acid or a derivative thereof with ethylene glycol.

Examples of the polybutylene terephthalate can include polymers obtained by polycondensation of terephthalic acid or a derivative thereof with 1,4-butanediol.

Examples of the polytrimethylene terephthalate can include polymers obtained by polycondensation of terephthalic acid or a derivative thereof with 1,3-propanediol.

Examples of the polycarbonate can include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide can include linear polyphenylene sulfide, crosslinked polyphenylene sulfide having a high molecular weight obtained by performing a curing reaction after polymerization, polyphenylene sulfide sulfone, polyphenylene sulfide ether, and polyphenylene sulfide ketone.

Examples of the modified polyphenylene ether include a polymer alloy of poly(2,6-dimethyl-1,4-phenylene)ether and polystyrene; a polymer alloy of poly(2,6-dimethyl-1,4-phenylene)ether and a styrene/butadiene copolymer; a polymer alloy of poly(2,6-dimethyl-1,4-phenylene)ether and a styrene/maleic anhydride copolymer; a polymer alloy of poly(2,6-dimethyl-1,4-phenylene)ether and polyamide; a polymer alloy of poly(2,6-dimethyl-1,4-phenylene)ether and a styrene/butadiene/acrylonitrile copolymer.

Examples of the polyaryl ether ketone can include polyetherketone (PEK), polyetheretherketone (PEEK), polyetherketoneketone (PEKK), and polyetheretherketoneketone (PEEKK).

Examples of the liquid crystal polymer (LCP) can include a polymer (copolymer) composed of one or more structural units selected from aromatic hydroxycarbonyl units which are thermotropic liquid crystal polyesters, aromatic dihydroxy units, aromatic dicarbonyl units, aliphatic dihydroxy units, and aliphatic dicarbonyl units.

Examples of the fluororesin can include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin can include copolymers of an olefin or a styrene and an unsaturated carboxylic acid, wherein a part of carboxyl groups is neutralized with a metal ion.

Examples of the olefin/vinyl alcohol resin can include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin can include monocyclic compounds such as cyclohexene, polycyclic compounds such as tetracyclopentadiene, and polymers of cyclic olefin monomers.

Examples of the polylactic acid can include poly-L-lactic acid, which is a homopolymer of L-form, poly-D-lactic acid, which is a homopolymer of D-form, or a stereocomplex polylactic acid which is a mixture thereof.

Examples of the cellulose resin can include methylcellulose, ethylcellulose, hydroxycellulose, hydroxymethylcellulose, hydroxyethylcellulose, hydroxyethyl methylcellulose, hydroxypropyl methylcellulose, cellulose acetate, cellulose propionate, and cellulose butyrate.

Examples of the above thermosetting resin can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicon (SI) resins, furan (FR) resins, benzoguanamine (BR) resins, alkyd resins, xylene resins, bismaleimide triazine (BT) resins, and diallyl phthalate resin (PDAP).

Specific examples of the unsaturated polyester can include resins obtained by esterification reaction of aliphatic unsaturated dicarboxylic acid and aliphatic diol.

Examples of the vinyl ester resin can include bis vinyl ester resins and novolac vinyl ester resins.

Examples of the epoxy resin can include bisphenol A epoxy resins, bisphenol F epoxy resins, bisphenol E epoxy resins, bisphenol S epoxy resins, bisphenol M epoxy resins (4,4'-(1,3-phenylenediisopridiene)bisphenol epoxy resins), bisphenol P epoxy resins (4,4'-(1,4-phenylenediisopridiene) bisphenol epoxy resins), bisphenol Z epoxy resins (4,4'-cyclohexadiene bisphenol epoxy resins), phenol novolac epoxy resins, cresol novolac epoxy resins, tetraphenol group ethane novolac epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbornene epoxy resins, adamantane epoxy resins, and fluorene epoxy resins.

Examples of the melamine resin can include a polymer formed by polycondensation of melamine (2,4,6-triamino-1,3,5-triazine) and formaldehyde.

Examples of the phenolic resin can include novolac phenolic resins such as phenol novolac resins, cresol novolac resins, and bisphenol A novolac resins, resol phenol resins such as methylol resole resins and dimethylene ether resole resins, or aryl alkylene phenol resins, and can include one of these or combinations of two or more.

Examples of the urea resin can include a resin obtained by condensation of urea and formaldehyde.

The above thermoplastic resin or the above thermosetting resin may be used singly or in combinations of two or more.

As the resin included in the glass fiber-reinforced resin molded article of the present embodiment, polyamide, polyarylene sulfide, or polybutylene terephthalate is preferable. Polybutylene terephthalate is more preferable because of its large effect of improving dimension stability and dielectric characteristics due to inclusion of the glass fiber satisfying the formula (1).

In the glass fiber-reinforced resin molded article of the present embodiment, the glass fiber content is, for example, in the range of 10.0 to 70.0% by mass, preferably in the range of 20.0 to 60.0% by mass, more preferably in the range of 25.0 to 57.5% by mass, further preferably in the range of 30.0 to 55.0% by mass, particularly preferably in the range of 40.0 to 52.5% by mass, and most preferably in the range of 45.0 to 52.0% by mass.

The glass fiber content in the glass fiber-reinforced resin molded article of the present embodiment can be calculated in accordance with JIS K 7052:1999.

In the glass fiber-reinforced resin molded article of the present embodiment, the resin content is, for example, in the range of 30.0 to 90.0% by mass, preferably in the range of 40.0 to 80.0% by mass, more preferably in the range of 42.5 to 75.0% by mass, further preferably in the range of 45.0 to 70.0% by mass, particularly preferably in the range of 47.5 to 60.0% by mass, and most preferably in the range of 48.0 to 52.0% by mass.

The glass fiber-reinforced resin molded article of the present invention can include components other than the glass fiber and the resin as long as the object of the present invention is not impaired. Examples of such components can include glass fiber other than the glass fiber (e.g., E glass fiber and S glass fiber), reinforcing fiber other than glass fiber (e.g., carbon fiber and metal fiber), a filler other than glass fiber (e.g., glass powder, talc, and mica), a flame retardant, a UV absorber, a heat stabilizer, an antioxidant, an antistatic agent, a fluidity improver, an anti-blocking agent, a lubricant, a nucleating agent, an antibacterial agent, and pigment. The glass fiber-reinforced resin molded article of the present invention can contain these components in a range of 0 to 40% by mass in total with respect to the total amount of the glass fiber-reinforced resin molded article.

Examples of a molding method to obtain the glass fiber-reinforced resin molded article of the present embodiment can include injection molding method, injection compression molding method, two-color molding method, hollow molding method, foam molding method (including one in which supercritical fluid is used), insert molding method, in-mold coating molding method, extrusion molding method, sheet molding method, thermal molding method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method. Among these methods, the injection molding method is preferable because of its excellent production efficiency.

For example, when the glass fiber-reinforced resin molded article of the present invention is produced by the injection molding method, chopped strands of the glass fiber are kneaded with the resin, then extruded from a nozzle, and is processed into pellets by cutting it to a predetermined length (e.g., length in the range of 1 to 50 mm), which can be used as a molding raw material. Alternatively, rovings of the glass fiber are impregnated with melted thermoplastic resin, cooled, and then processed into pellets by cutting it to a predetermined length (e.g., length in the range of 1 to 50 mm), which can be used as a molding raw material.

Examples of applications of the glass fiber-reinforced resin molded article of the present embodiment can include housings and parts such as frames of portable electronic devices including smartphones, automobile electrical parts such as battery tray covers, sensors, and coil bobbins, electronic device parts other than those for portable electronic devices, and electrical connecting terminal parts.

Next, Examples and Comparative Examples of the present invention will be shown.

EXAMPLES

[Glass Composition]

Four types of glass compositions, compositions 1 to 4, shown in Table 1, were used. The composition 2 here corresponds to the E glass composition. The glass fiber dielectric constant at a measurement frequency of 1 GHz and glass fiber linear expansion coefficient in the table are values calculated by the methods described above.

The density can be measured by specific gravity measurement by use of Archimedes' principle, using a glass mass obtained in the entirely same manner as in the method for measuring the glass fiber dielectric constant described above. Specifically, the weight of the glass mass in air A (density $\rho_1$) and the weight thereof in ion exchange water B (density $\rho_0$) as substitution liquid are measured with a specific gravity meter (manufactured by METTLER TOLEDO), the specific gravity ($\rho$) is calculated from the following formula ($\beta$), and thus, the density of the glass fiber can be measured.

$$\rho = \rho_1 + A((\rho_0 - \rho_1)/(A - B)) \quad (\beta)$$

The glass fiber strength can be measured by the following method. First, molten glass is obtained in the entirely same manner as in the method for measuring the dielectric constant of the glass fiber described above. Next, the obtained molten glass is poured onto a carbon plate to produce a glass cullet. The obtained glass cullet is charged into a small cylindrical platinum bushing having a circular nozzle tip at the bottom thereof, and the bushing is heated to a predetermined temperature to melt the glass cullet such that the viscosity of the charged glass cullet becomes 1000±150 poise to yield a molten glass. The molten glass discharged through the nozzle tip of the platinum bushing is wound up at a predetermined speed by a winder and solidified by cooling while being stretched to a glass fiber diameter of 13±2 μm, thereby obtaining a glass fiber comprising a perfectly circular cross section. A single fiber (monofilament) between the nozzle tip of the platinum bushing and the winder is taken as a sample for tensile strength evaluation of glass fiber in a state where deterioration due to contact or friction has been minimized. Next, the obtained monofilament is placed and bonded in the longitudinal direction along the line connecting the center points of the short sides of a mount having two grip sections and two support sections to prepare a monofilament test piece. Next, the diameter of the monofilament is measured with a scanning electron microscope (trade name: S-3400, manufactured by Hitachi, Ltd.), and the cross-sectional area of the monofilament is calculated from the obtained diameter. Next, the two grip sections in the mount are set in the upper and lower grips of a tensile tester (manufactured by A&D Company, Limited, trade name: Tabletop Material Testing Instrument STB-1225S), the distance between the upper and lower grips being set at 25 mm. The two support sections of the mount are cut off to allow the grip sections to be connected only by the monofilament. Then, a tensile test is carried out at a crosshead speed of 5 mm/min. Next, the tensile strength is calculated by dividing the maximum load value at a break of the monofilament by the cross-sectional area of the monofilament. The average value of the tensile strength of n=30 is calculated, with the monofilament test piece in which an incomplete break such as cast-off or crease has occurred during the measurement excluded, enabling the glass fiber strength to be measured.

The mount comprises 25-mm short sides and 50-mm long sides, comprises a cut out section having 15-mm short sides and 25-mm long sides inside at the center, such that the short sides and long sides of the mount are parallel to the short sides and long sides of the cut out section, respectively, comprises grip sections between the short side of the cut out section and the short side of the mount, the grip sections being set in the grips of a tensile tester, and also comprises support sections between the long side of the cut out section and the long side of the mount, the support sections connecting and supporting the two grip sections.

and 50-mm long sides inside at the center, such that the short sides and long sides of the mount are parallel to the short sides and long sides of the cut out section, respectively, comprises grip sections between the short side of the cut out section and the short side of the mount, the grip sections being set in the grips of a tensile tester, and also comprises support sections between the long side of the cut out section and the long side of the mount, the support sections connecting and supporting the two grip sections.

TABLE 1

|  | Composition 1 | Composition 2 | Composition 3 | Composition 4 |
|---|---|---|---|---|
| $SiO_2$ (% by mass) | 65.00 | 54.60 | 59.40 | 54.50 |
| $Al_2O_3$ (% by mass) | 25.00 | 14.10 | 18.90 | 14.60 |
| MgO (% by mass) | 9.50 | 1.20 | 9.90 | 4.20 |
| CaO (% by mass) | 0.05 | 22.40 | 11.10 | 4.10 |
| $Fe_2O_3$ (% by mass) | 0.30 | 0.20 | 0.10 | 0.10 |
| $ZrO_2$ (% by mass) | 0.05 | 0.00 | 0.00 | 0.00 |
| $Li_2O + Na_2O + K_2O$ (% by mass) | 0.10 | 0.50 | 0.10 | 0.20 |
| $B_2O_3$ (% by mass) | 0.00 | 6.10 | 0.50 | 19.40 |
| $TiO_2$ (% by mass) | 0.00 | 0.30 | 0.00 | 1.90 |
| $F_2$ (% by mass) | 0.00 | 0.60 | 0.00 | 1.00 |
| Total (% by mass) | 100.00 | 100.00 | 100.00 | 100.00 |
| $MgO/(CaO + Fe_2O_3)$ | 27.1 | 0.1 | 0.9 | 1.0 |
| Glass fiber dielectric constant @ 1 GHz | 5.4 | 6.8 | 6.4 | 4.8 |
| Glass fiber linear expansion coefficient (ppm/K) | 2.8 | 5.6 | 4.0 | 3.3 |
| Density (g/cm$^3$) | 2.5 | 2.6 | 2.6 | 2.3 |
| Glass fiber strength (GPa) | 4.8 | 3.2 | 4.2 | 3.0 |
| Glass fiber elastic modulus (GPa) | 88 | 76 | 85 | 66 |

The glass fiber elastic modulus can be measured by the following method. First, a monofilament is obtained in the entirely same manner as in the method for measuring the glass fiber strength described above. Next, the obtained monofilament is placed and bonded in the longitudinal direction along the line connecting the center points of the short sides of a mount having two grip sections and two support sections to prepare a monofilament test piece. Next, the diameter of the monofilament is measured with a scanning electron microscope (trade name: S-3400, manufactured by Hitachi, Ltd.), and the cross-sectional area of the monofilament is calculated from the obtained diameter. Next, the two grip sections in the mount are set in the upper and lower grips of a tensile tester (manufactured by A&D Company, Limited, trade name: Tabletop Material Testing Instrument STB-1225S), the distance between the upper and lower grips being set at 50 mm. The two support sections of the mount are cut off to allow the grip sections to be connected only by the monofilament. Then, a tensile test is carried out at a crosshead speed of 5 mm/min. Next, the tensile elastic modulus is calculated by defining stresses σ1 and σ2 corresponding to the strains between two points ε1=0.0005 and ε2=0.0025, respectively, and dividing the stress difference (σ2−σ1) by the strain difference (ε2−ε1). The average value of the tensile elastic modulus of n=15 is calculated, with any monofilament test piece in which cast-off has occurred during the measurement excluded, enabling the glass fiber elastic modulus to be measured.

The mount comprises 25-mm short sides and 75-mm long sides, comprises a cut out section having 15-mm short sides

[Resin]

As a polyamide (denoted as PA in Tables), UBE NYLON 1015B (trade name, manufactured by Ube Industries, Ltd.) was used.

As a polyphenylene sulfide (denoted as PPS in Tables), Fortron KPS W-203A (trade name, manufactured by KUREHA CORPORATION) was used.

As polybutylene terephthalate (denoted as PBT in Tables), DURANEX 2000 (trade name, manufactured by Polyplastics Co., Ltd.) was used.

[Bending Strength and Flexural Modulus of Molded Article]

The bending strength and flexural modulus of the glass fiber-reinforced resin molded article were measured in accordance with JIS K 7171:2016 under a condition of test temperature of 23° C. using a precision universal tester (manufactured by Shimadzu Corporation, trade name: Autograph AG-5000B).

[Notched Charpy Impact Strength of Molded Article]

The notched Charpy impact strength of the glass fiber-reinforced resin molded article was measured in accordance with ISO 179.

[Dielectric Constant of Molded Article]

The dielectric constant of the molded article was measured at a measurement frequency of 1 GHz by the method described above.

[Linear Expansion Coefficient of Molded Article]

The linear expansion coefficient of the molded article was calculated by the method described above.

Examples 1 to 3 and Comparative Examples 1 to 4

The fiber diameter, cut length (3 mm), and amount compounded of the glass fiber of chopped strands comprising the compositions 1 to 4 described above were adjusted such that the fiber diameter of the glass fiber, the number average fiber length of the glass fiber, and the glass fiber content in a glass fiber-reinforced resin molded article corresponded to those of Examples 1 to 3 shown in Table 2 and Comparative Examples 1 to 4 shown in Table 3. Next, the chopped strands and the polyamide were kneaded with a screw rotation speed of 100 rpm in a twin-screw kneader (manufactured by SHIBAURA MACHINE CO., LTD., trade name: TEM-26SS) to thereby produce resin pellets. The mass of the glass fiber in the glass fiber-reinforced resin molded article here is determined by the composition, fiber diameter, and number bundled of the glass fiber, and the cut length and number of the glass fiber. Next, the resin pellets obtained were used to conduct injection molding in an injection molding apparatus (manufactured by Nissei Plastic Industrial Co. Ltd., trade name: NEX80) at a mold temperature of 90° C. and an injection temperature of 270° C. to thereby obtain the glass fiber-reinforced resin molded articles of Examples 1 to 3 and Comparative Examples 1 to 4. The glass fiber-reinforced resin molded articles of Examples 1 to 3 and Comparative Examples 1 to 4 were evaluated for the bending strength of the molded articles, the flexural modulus of the molded articles, the notched Charpy impact strength of the molded articles, the dielectric constant of the molded articles, and the linear expansion coefficient of the molded articles by the methods described above. The results are shown in Table 2 and Table 3. The dimension stability—dielectric characteristic index in Tables here is a ratio ((MDk×MC)/(EDk×EC)) of a value (MDk×MC) obtained by multiplying the dielectric constant MDk of the molded article by the linear expansion coefficient MC of the molded article to a value (EDk×EC) obtained by multiplying the dielectric constant EDk of the reference glass fiber-reinforced resin molded article by the linear expansion coefficient EC of the reference glass fiber-reinforced resin molded article. The reference glass fiber-reinforced resin molded article here is a glass fiber-reinforced resin molded article that includes glass fiber comprising an E glass composition and having a fiber diameter of 11.0 m at the same glass content as that of the molded article and has been produced by the same molding conditions as those of the molded article.

TABLE 2

|  | Example 1 | Example 2 | Example 3 |
|---|---|---|---|
| Glass composition of glass fiber | Composition 1 | Composition 1 | Composition 1 |
| Glass fiber dielectric constant Dk | 5.4 | 5.4 | 5.4 |
| Glass fiber linear expansion coefficient C (ppm/K) | 2.8 | 2.8 | 2.8 |
| Glass fiber diameter D (μm) | 11 | 9 | 11 |
| Glass fiber number average fiber length L in molded article (μm) | 284 | 255 | 245 |
| Glass fiber content in molded article (% by mass) | 30.0 | 30.0 | 50.0 |
| $Dk \times C^{1/4} \times L^{1/2}/D^{1/4}$ | 64.6 | 64.4 | 60.0 |
| Resin type | PA | PA | PA |
| Resin content in molded article (% by mass) | 70.0 | 70.0 | 50.0 |
| Molded article bending strength (MPa) | 273 | 280 | 360 |
| Molded article flexural modulus (GPa) | 9 | 9 | 16.5 |
| Notched Charpy impact strength (KJ/cm²) | 19 | 18 | 22 |
| Molded article dielectric constant | 3.35 | 3.35 | 3.70 |
| Molded article linear expansion coefficient (ppm/K) | 2.71 | 2.72 | 2.12 |
| Molded article dielectric constant × Molded article linear expansion coefficient | 9.1 | 9.1 | 7.8 |
| Dimension stability - dielectric characteristic index | 0.84 | 0.84 | 0.77 |

TABLE 3

|  | Comparative Example 1 | Comparative Example 2 | Comparative Example 3 | Comparative Example 4 |
|---|---|---|---|---|
| Glass composition of glass fiber | Composition 2 | Composition 2 | Composition 3 | Composition 4 |
| Glass fiber dielectric constant Dk | 6.8 | 6.8 | 6.4 | 4.8 |
| Glass fiber linear expansion coefficient C (ppm/K) | 5.6 | 5.6 | 4.0 | 3.3 |
| Glass fiber diameter D (μm) | 11 | 11 | 11 | 11 |
| Glass fiber number average fiber length L in molded article (μm) | 261 | 231 | 237 | 248 |
| Glass fiber content in molded article (% by mass) | 30.0 | 50.0 | 30.0 | 30.0 |
| $Dk \times C^{1/4} \times L^{1/2}/D^{1/4}$ | 92.8 | 87.3 | 76.5 | 55.9 |
| Resin type | PA | PA | PA | PA |
| Resin content in molded article (% by mass) | 70.0 | 50.0 | 70.0 | 70.0 |
| Molded article bending strength (MPa) | 250 | 325 | 265 | 242 |

TABLE 3-continued

|  | Comparative Example 1 | Comparative Example 2 | Comparative Example 3 | Comparative Example 4 |
|---|---|---|---|---|
| Molded article flexural modulus (GPa) | 8 | 14 | 8.5 | 7.5 |
| Notched Charpy impact strength (KJ/cm$^2$) | 15 | 20 | 17 | 16 |
| Molded article dielectric constant | 3.50 | 4.00 | 3.50 | 3.20 |
| Molded article linear expansion coefficient (ppm/K) | 3.10 | 2.56 | 2.89 | 2.99 |
| Molded article dielectric constant × Molded article linear expansion coefficient | 10.9 | 10.2 | 10.1 | 9.6 |
| Dimension stability - dielectric characteristic index | 1 | 1 | 0.93 | 0.88 |

Examples 4 to 5 and Comparative Examples 5 to 7

The fiber diameter, cut length (3 mm), and amount compounded of the glass fiber of chopped strands comprising the compositions 1 to 4 described above were adjusted such that the fiber diameter of the glass fiber, the number average fiber length of the glass fiber, and the glass fiber content in a glass fiber-reinforced resin molded article corresponded to those of Examples 4 to 5 and Comparative Examples 5 to 7 shown in Table 4. Next, the chopped strands and the polyphenylene sulfide were kneaded with a screw rotation speed of 100 rpm in a twin-screw kneader (manufactured by SHIBAURA MACHINE CO., LTD., trade name: TEM-26SS) to thereby produce resin pellets. The mass of the glass fiber in the glass fiber-reinforced resin molded article here is determined by the composition, fiber diameter, and number bundled of the glass fiber, and the cut length and number of the glass fiber. Next, the resin pellets obtained were used to conduct injection molding in an injection molding apparatus (manufactured by Nissei Plastic Industrial Co. Ltd., trade name: NEX80) at a mold temperature of 140° C. and an injection temperature of 330° C. to thereby obtain the glass fiber-reinforced resin molded articles of Examples 4 to 5 and Comparative Examples 5 to 7. The glass fiber-reinforced resin molded articles of Examples 4 to 5 and Comparative Examples 5 to 7 were evaluated for the bending strength of the molded articles, the flexural modulus of the molded articles, the notched Charpy impact strength of the molded articles, the dielectric constant of the molded articles, and the linear expansion coefficient of the molded articles by the methods described above. The results are shown in Table 4. The dimension stability—dielectric characteristic index in Tables here is a ratio ((MDk×MC)/(EDk×EC)) of a value (MDk×MC) obtained by multiplying the dielectric constant MDk of the molded article by the linear expansion coefficient MC of the molded article to a value (EDk×EC) obtained by multiplying the dielectric constant EDk of the reference glass fiber-reinforced resin molded article by the linear expansion coefficient EC of the reference glass fiber-reinforced resin molded article. The reference glass fiber-reinforced resin molded article here is a glass fiber-reinforced resin molded article that includes glass fiber comprising an E glass composition and having a fiber diameter of 11.0 m at the same glass content as that of the molded article and has been produced by the same molding conditions as those of the molded article.

TABLE 4

|  | Example 4 | Example 5 | Comparative Example 5 | Comparative Example 6 | Comparative Example 7 |
|---|---|---|---|---|---|
| Glass composition of glass fiber | Composition 1 | Composition 1 | Composition 2 | Composition 3 | Composition 4 |
| Glass fiber dielectric constant Dk | 5.4 | 5.4 | 6.8 | 6.4 | 4.8 |
| Glass fiber linear expansion coefficient C (ppm/K) | 2.8 | 2.8 | 5.3 | 4 | 3.3 |
| Glass fiber diameter D (μm) | 11 | 9 | 11 | 11 | 11 |
| Glass fiber number average fiber length L in molded article (μm) | 275 | 252 | 250 | 245 | 243 |
| Glass fiber content in molded article (% by mass) | 40.0 | 40.0 | 40.0 | 40.0 | 40.0 |
| Dk × C$^{1/4}$ × L$^{1/2}$/D$^{1/4}$ | 63.6 | 64.0 | 89.6 | 77.8 | 55.4 |
| Resin type | PPS | PPS | PPS | PPS | PPS |
| Resin content in molded article (% by mass) | 60.0 | 60.0 | 60.0 | 60.0 | 60.0 |
| Molded article bending strength (MPa) | 295 | 303 | 265 | 285 | 253 |
| Molded article flexural modulus (GPa) | 17 | 17 | 15 | 16 | 14 |

TABLE 4-continued

|  | Example 4 | Example 5 | Comparative Example 5 | Comparative Example 6 | Comparative Example 7 |
|---|---|---|---|---|---|
| Notched Charpy impact strength (KJ/cm²) | 13 | 13 | 12 | 12.5 | 12 |
| Molded article dielectric constant | 3.6 | 3.6 | 3.7 | 3.7 | 3.5 |
| Molded article linear expansion coefficient (ppm/K) | 2.47 | 2.48 | 2.83 | 2.68 | 2.75 |
| Molded article dielectric constant × Molded article linear expansion coefficient | 8.9 | 8.9 | 10.5 | 9.9 | 9.6 |
| Dimension stability - dielectric characteristic index | 0.85 | 0.85 | 1.00 | 0.95 | 0.92 |

Examples 6 to 8 and Comparative Examples 8 to 11

The fiber diameter, cut length (3 mm), and amount compounded of the glass fiber of chopped strands comprising the compositions 1 to 4 described above were adjusted such that the fiber diameter of the glass fiber, the number average fiber length of the glass fiber, and the glass fiber content in a glass fiber-reinforced resin molded article corresponded to those of Examples 6 to 8 shown in Table 5 and Comparative Examples 8 to 11 shown in Table 6. Next, the chopped strands and the polybutylene terephthalate were kneaded with a screw rotation speed of 100 rpm in a twin-screw kneader (manufactured by SHIBAURA MACHINE CO., LTD., trade name: TEM-26SS) to thereby produce resin pellets. The mass of the glass fiber in the glass fiber-reinforced resin molded article here is determined by the composition, fiber diameter, and number bundled of the glass fiber, and the cut length and number of the glass fiber. Next, the resin pellets obtained were used to conduct injection molding in an injection molding apparatus (manufactured by Nissei Plastic Industrial Co. Ltd., trade name: NEX80) at a mold temperature of 90° C. and an injection temperature of 250° C. to thereby obtain the glass fiber-reinforced resin molded articles of Examples 6 to 8 and Comparative Examples 8 to 11. The glass fiber-reinforced resin molded articles of Examples 6 to 8 and Comparative Examples 8 to 11 were evaluated for the bending strength of the molded articles, the flexural modulus of the molded articles, the notched Charpy impact strength of the molded articles, the dielectric constant of the molded articles, and the linear expansion coefficient of the molded articles by the methods described above. The results are shown in Table 5 and Table 6. The dimension stability—dielectric characteristic index in Tables here is a ratio ((MDk×MC)/(EDk×EC)) of a value (MDk×MC) obtained by multiplying the dielectric constant MDk of the molded article by the linear expansion coefficient MC of the molded article to a value (EDk×EC) obtained by multiplying the dielectric constant EDk of the reference glass fiber-reinforced resin molded article by the linear expansion coefficient EC of the reference glass fiber-reinforced resin molded article. The reference glass fiber-reinforced resin molded article here is a glass fiber-reinforced resin molded article that includes glass fiber comprising an E glass composition and having a fiber diameter of 11.0 m at the same glass content as that of the molded article and has been produced by the same molding conditions as those of the molded article.

TABLE 5

|  | Example 6 | Example 7 | Example 8 |
|---|---|---|---|
| Glass composition of glass fiber | Composition 1 | Composition 1 | Composition 1 |
| Glass fiber dielectric constant Dk | 5.4 | 5.4 | 5.4 |
| Glass fiber linear expansion coefficient C (ppm/K) | 2.8 | 2.8 | 2.8 |
| Glass fiber diameter D (μm) | 11 | 9 | 11 |
| Glass fiber number average fiber length L in molded article (μm) | 273 | 258 | 244 |
| Glass fiber content in molded article (% by mass) | 30.0 | 30.0 | 50.0 |
| $Dk \times C^{1/4} \times L^{1/2}/D^{1/4}$ | 63.4 | 64.8 | 59.9 |
| Resin type | PBT | PBT | PBT |
| Resin content in molded article (% by mass) | 70.0 | 70.0 | 50.0 |
| Molded article bending strength (MPa) | 235 | 240 | 265 |
| Molded article flexural modulus (GPa) | 10 | 10 | 16 |
| Notched Charpy impact strength (KJ/cm²) | 11 | 11 | 13 |
| Molded article dielectric constant | 3.30 | 3.30 | 3.65 |
| Molded article linear expansion coefficient (ppm/K) | 1.90 | 1.89 | 1.52 |
| Molded article dielectric constant × Molded article linear expansion coefficient | 6.3 | 6.2 | 5.5 |
| Dimension stability - dielectric characteristic index | 0.83 | 0.83 | 0.74 |

TABLE 6

|  | Comparative Example 8 | Comparative Example 9 | Comparative Example 10 | Comparative Example 11 |
|---|---|---|---|---|
| Glass composition of glass fiber | Composition 2 | Composition 2 | Composition 3 | Composition 4 |
| Glass fiber dielectric constant Dk | 6.8 | 6.8 | 6.4 | 4.8 |

TABLE 6-continued

| | Comparative Example 8 | Comparative Example 9 | Comparative Example 10 | Comparative Example 11 |
|---|---|---|---|---|
| Glass fiber linear expansion coefficient C (ppm/K) | 5.6 | 5.6 | 4.0 | 3.3 |
| Glass fiber diameter D (μm) | 11 | 11 | 11 | 11 |
| Glass fiber number average fiber length L in molded article (μm) | 254 | 229 | 260 | 246 |
| Glass fiber content in molded article (% by mass) | 30.0 | 50.0 | 30.0 | 30.0 |
| $Dk \times C^{1/4} \times L^{1/2}/D^{1/4}$ | 91.5 | 86.9 | 80.1 | 55.7 |
| Resin type | PBT | PBT | PBT | PBT |
| Resin content in molded article (% by mass) | 70.0 | 50.0 | 70.0 | 70.0 |
| Molded article bending strength (MPa) | 200 | 230 | 225 | 193 |
| Molded article flexural modulus (GPa) | 9 | 14 | 9.5 | 8.5 |
| Notched Charpy impact strength (KJ/cm²) | 10 | 12 | 10.5 | 10 |
| Molded article dielectric constant | 3.40 | 3.90 | 3.40 | 3.20 |
| Molded article linear expansion coefficient (ppm/K) | 2.21 | 1.93 | 2.09 | 2.15 |
| Molded article dielectric constant × Molded article linear expansion coefficient | 7.5 | 7.5 | 7.1 | 6.9 |
| Dimension stability - dielectric characteristic index | 1 | 1 | 0.95 | 0.92 |

As shown in Tables 2 to 6, in the glass fiber-reinforced resin molded articles of Examples 1 to 8, it is obvious that the fiber diameter D of the glass fiber included in the glass fiber-reinforced resin molded articles is in the range of 5.0 to 15.0 μm, the dielectric constant at a measurement frequency of 1 GHz Dk of the glass fiber included in the glass fiber-reinforced resin molded articles is in the range of 4.0 to 7.0, the linear expansion coefficient C of the glass fiber included in the glass fiber-reinforced resin molded articles is in the range of 2.0 to 6.0 ppm/K, the number average fiber length L of the glass fiber included in the glass fiber-reinforced resin molded article is in the range of 150 to 400 μm, and the D, Dk, C, and L satisfy the following formula (1). As the dimension stability—dielectric characteristic index is 0.85 or less, it can be said that the glass fiber-reinforced resin molded articles of Examples 1 to 8 combine high dimension stability and low dielectric characteristics.

$$57.9 \leq Dk \times C^{1/4} \times L^{1/2}/D^{1/4} \leq 70.6 \quad (1)$$

In contrast, the glass fiber-reinforced resin molded articles of Comparative Examples 1 to 11 do not satisfy the above formula (1). As the dimension stability—dielectric characteristic index exceeds 0.85, it cannot be said that the glass fiber-reinforced resin molded articles of Comparative Examples 1 to 11 combine high dimension stability and low dielectric characteristics.

The invention claimed is:

1. A glass fiber-reinforced resin molded article, wherein
a fiber diameter D of glass fiber included in the glass fiber-reinforced resin molded article is in a range of 5.0 to 15.0 μm,
a dielectric constant Dk at a measurement frequency of 1 GHz of the glass fiber included in the glass fiber-reinforced resin molded article is in a range of 5.1 to 7.0,
a linear expansion coefficient C of the glass fiber included in the glass fiber-reinforced resin molded article is in a range of 2.0 to 6.0 ppm/K,
a number average fiber length L of the glass fiber included in the glass fiber-reinforced resin molded article is in a range of 150 to 400 μm, and
the D, Dk, C, and L satisfy a following formula (1):

$$58.2 \leq Dk \times C^{1/4} \times L^{1/2}/D^{1/4} \leq 61.7 \quad (1)$$

2. The glass fiber-reinforced resin molded article according to claim 1, wherein
the glass fiber included in the glass fiber-reinforced resin molded article comprises a composition including
$SiO_2$ in a range of 60.00 to 70.00% by mass,
$Al_2O_3$ in a range of 20.00 to 30.00% by mass,
$MgO$ in a range of 5.00 to 15.0% by mass,
$Fe_2O_3$ in a range of 0.15 to 1.50% by mass, and
$Li_2O$, $Na_2O$, and $K_2O$ in a range of 0.02 to 0.20% by mass in total, with respect to a total amount of the glass fiber.

3. The glass fiber-reinforced resin molded article according to claim 1, wherein a resin contained in the glass fiber-reinforced resin molded article is polybutylene terephthalate.

4. The glass fiber-reinforced resin molded article according to claim 2, wherein a resin contained in the glass fiber-reinforced resin molded article is polybutylene terephthalate.

* * * * *